United States Patent [19]
Hilty

[11] Patent Number: 6,035,575
[45] Date of Patent: Mar. 14, 2000

[54] MARINE ANIMAL TRAP ENTRANCE GATE

[76] Inventor: David J. Hilty, 15414 Smokey Pt. Blvd. #350, Arlington, Wash. 98223

[21] Appl. No.: 09/243,699

[22] Filed: Feb. 3, 1999

Related U.S. Application Data

[60] Provisional application No. 60/108,735, Nov. 17, 1998.

[51] Int. Cl.[7] .................................................. A01K 69/06
[52] U.S. Cl. .............................................. 43/100; 43/102
[58] Field of Search ................................ 43/61, 65, 102, 43/103, 100

[56] References Cited

U.S. PATENT DOCUMENTS

| | | | |
|---|---|---|---|
| 2,178,789 | 11/1939 | Heath | 43/66 |
| 3,393,468 | 7/1968 | Wood et al. | 43/66 |
| 4,356,087 | 10/1982 | Miles | 210/131 |
| 5,924,237 | 7/1999 | Ives | 43/100 |

FOREIGN PATENT DOCUMENTS

| | | | |
|---|---|---|---|
| 419896 | 8/1910 | France | 43/100 |
| 41136 | 8/1916 | Sweden | 43/100 |

*Primary Examiner*—Michael J. Carone
*Assistant Examiner*—Son T. Nguyen
*Attorney, Agent, or Firm*—Stoel Rives LLP

[57] ABSTRACT

An entrance gate for a marine animal trap includes an elongate hinge member and multiple finger-like bails pivotally mounted to the hinge member in spaced-apart relation along the length of the hinge member. A mounting surface of the hinge member is positioned adjacent an entrance frame of the trap and has a generally concave shape that is adapted to fit the contour of the interior face of the entrance frame. The hinge member is removably mounted to the entrance frame using wire or plastic ties. A pivot end of each bail of the entrance gate is rotatably or pivotally supported within a guide space of the hinge member. The bails extend through notches formed in the hinge member opposite the mounting surface. The notches allow the bails to pivot inwardly from a closed position to an open position. In the closed position, the bails span between the top and bottom portions of the entrance opening. The inward rotational movement toward the open position permits a marine animal to enter the chamber of the trap by pushing against the bails. After the marine animal passes the entrance gate, gravitational forces, assisted by a rotation-opposing device, cause the bails to return to the closed position to block egress of the trapped marine animal. Excluder bars are optionally rigidly mounted to the hinge member at intervals along the length of the hinge member so that the excluder bars span between the top and bottom portions of the frame and thereby exclude larger marine animals from the trap.

20 Claims, 5 Drawing Sheets

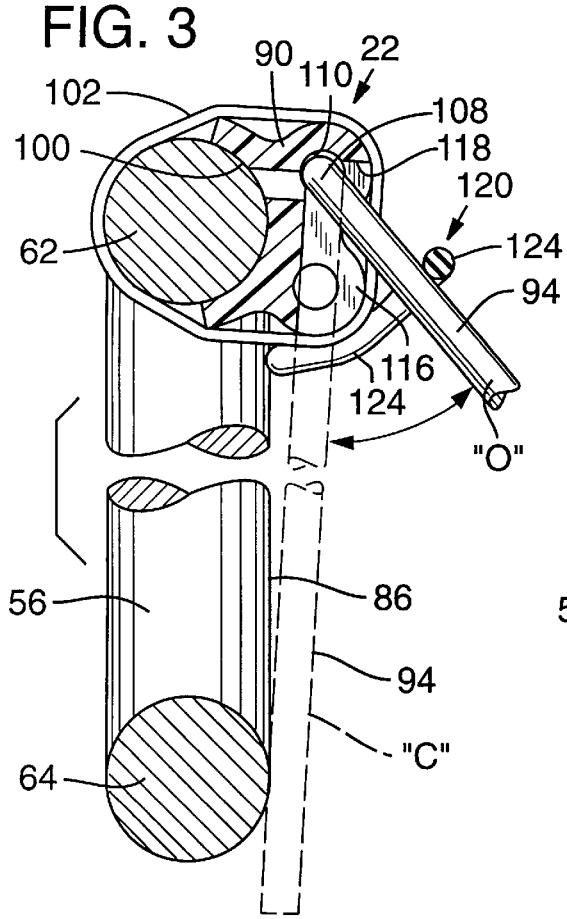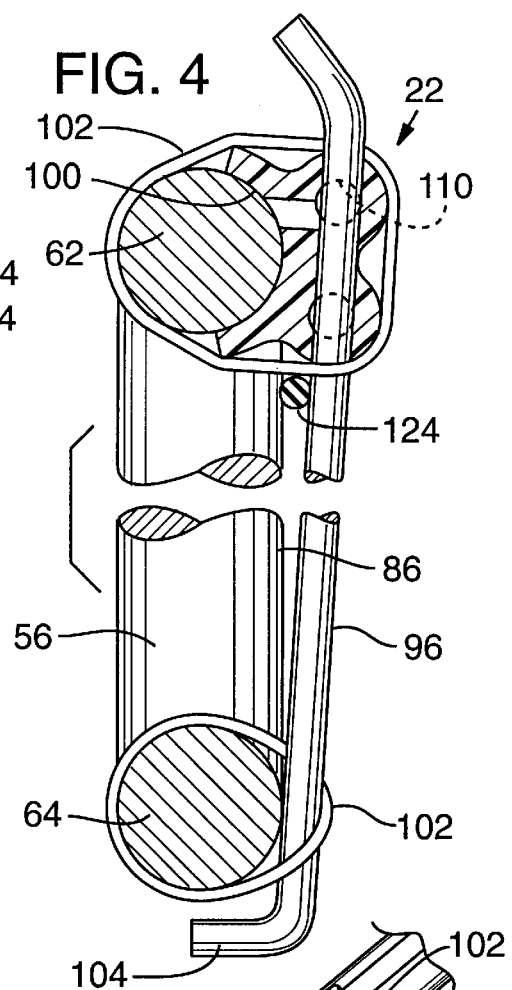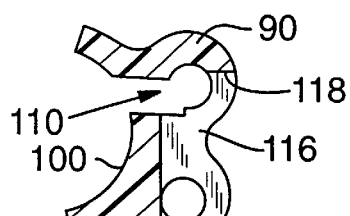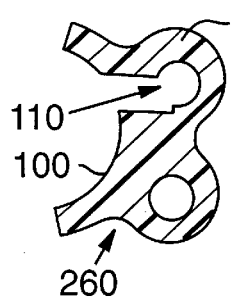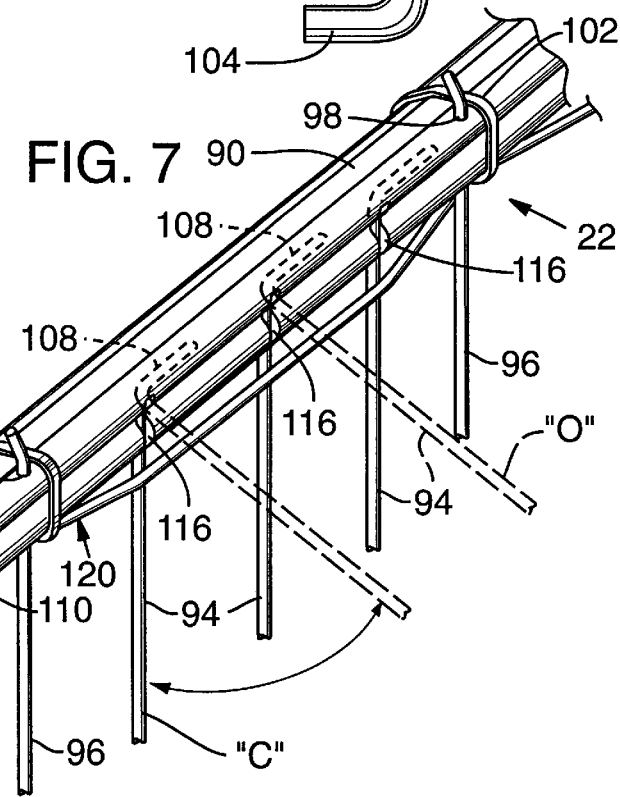

MARINE ANIMAL TRAP ENTRANCE GATE

Provisional application No. 60/108,735 filed Nov. 17, 1998.

TECHNICAL FIELD

The present invention relates to traps for catching marine animals and, in particular, to an improved entrance gate for using such a trap to catch bottom-dwelling fish such as cod and bottom-dwelling animals such as crabs.

BACKGROUND OF THE INVENTION

Traps for catching crab, commonly referred to as "crab pots," are well known. Crab pots typically include a box-shaped chamber defined by a metal trap frame that supports walls of netting or wire. A piece of bait meat is suspended in the center of the chamber by a hook or canister. One or more entrance tunnels formed in the netting extend inwardly to terminate in a generally rectangular entrance frame. Each entrance frame defines a trap opening or "eye" through which a crab may pass when entering the chamber of the trap in search of the bait. Each eye is positioned above a floor of the trap so that crabs fall into the chamber and are prevented from escaping. The bottom portion of the tunnel netting is called the tunnel ramp. So that crabs may easily enter the trap, it is important that the tunnel ramp is pulled taut. To pull the tunnel ramp taut, structural lines connect the entrance frames to draw them together toward the center of the chamber. To maximize the vertical spacing between the chamber floor and the eye, the entrance frame may be oriented in an inclined position so that the eye faces generally upward toward a top wall of the trap. The increased vertical spacing enables more crabs to accumulate within the chamber before any are able to easily escape through one of the entrance openings. The trap is lowered from a fishing vessel to the sea floor where crabs are believed to be located. A buoy, attached to the top of the trap by a line, floats on the surface of the water to facilitate location of the trap for retrieval after the trap has been allowed to "soak" for a time sufficient for it to fill with crabs, typically a few days.

Traps of this type may also be used to catch other types of marine animals, especially bottom-dwelling fish such as cod and the like. When fishing for swimming species, the eyes of the trap must be fitted with one-way entrance gates that allow marine animals to enter the trap but not to exit. These entrance gates, called "triggers" in the industry, may also be used when fishing for crabs or other crawling species to prevent the trapped crabs from escaping by crawling on the walls to reach one of the entrance openings.

When fishing for cod or other swimming species, some fishermen prefer to have each entrance opening oriented in a generally vertical plane to provide a more direct path through the trigger to the trap's bait. Vertical orientation is particularly important for effective operation of triggers having an elongated or tunnel-like profile. The inclined entrance frames of a typical crab trap may be converted to a vertical "cod position" (and vice-versa) by rearranging the structural lines that suspend the entrance frames in position relative to the trap frame. When converting an inclined entrance frame to the vertical position, slack tunnel netting is gathered and tied to the entrance frame to keep both the tunnel and the eye taut. One drawback of converting an inclined entrance opening to the vertical position is that the entrance tunnel netting stretches unevenly with use, which causes undesirable sagging in the tunnel ramp when the entrance opening is converted back to the inclined position for crab fishing. Also, converting the entrance opening from the inclined position to the vertical position and back again requires substantial time and effort. Thus, there is a need for a trigger that is effective for cod fishing when used in the inclined position to alleviate the need to convert entrance openings between inclined and vertical positions.

U.S. Pat. No. 4,184,283 of Wyman and U.S. Pat. No. 5,168,653 of Wyman et al. describe prior-art crab-trap triggers comprising comb-like structures formed of resilient, plastic tines rigidly mounted at one end to the entrance frame of a trap. The free ends of the tines extend inwardly across the entrance opening so that crabs are allowed to enter the trap by flexing the tines. The tines are arranged so that a trapped marine animal attempting to exit the trap will depress the tines across the entrance opening to block the exit path. U.S. Pat. No. 4,843,756 of Wyman et al. describes a similar trigger having a rectangular frame supporting resilient plastic tines around the entire frame. The tines extend inwardly from the rectangular frame toward the chamber of the trap so that they converge at their free ends. The extension of the tines from the entrance frame makes this trigger best suited for use with a vertically oriented entrance frame. The bottom tines of this trigger can be held open by slow-moving starfish or other creeping species as they enter the trap, which can provide an opportunity for trapped fish and faster-moving marine animals to escape.

A consideration in the design of triggers is minimizing the resistance encountered by a marine animal entering the trap. A marine animal that encounters too much resistance upon attempting to pass through the entrance gate is likely to be deterred from entering the trap. The flexibility and durability of plastic tines is significantly affected by environmental conditions. The impact resistance of the plastic tines is reduced when they are exposed to the cold temperatures to which traps are typically subjected during use and during on-deck storage, making the triggers susceptible to breakage. In the off-season, traps are typically stored out-of-doors where the damaging effects of sunlight, ultraviolet radiation, and heat can cause the tines to deform and become brittle.

U.S. Pat. No. 4,905,405 of Hendricks describes a prior-art trigger that includes a metal frame supporting top and bottom sets of rotatably mounted, rigid plastic fingers. The top set of fingers is weighted, e.g., by a metal insert, and hinged downwardly from a journal rod that extends horizontally across the top portion of the entrance opening. The bottom set of fingers is rotatably connected to a second journal rod that extends horizontally across the bottom portion of the entrance opening. The bottom set of fingers is formed of a plastic material that is buoyant in water so that the fingers extend upwardly from the second journal rod. The top and bottom fingers are independently hinged to rotate inwardly in response to a marine animal entering the trap. The frame includes stop bars positioned generally parallel to the journal rods to prevent outward rotation of the fingers. The top and bottom sets of plastic fingers are staggered so that the free ends of the fingers alternate to block the egress of a trapped marine animal. The bottom fingers of this trigger can be held open by slow-moving starfish or other creeping species as they enter the trap, which can provide an opportunity for trapped fish and faster-moving marine animals to escape. The trigger is complex and expensive to manufacture.

Hendricks teaches that galvanic corrosion of metal parts that are exposed to salt water induces small electrical currents originating at the site of the corrosion, i.e., the surface of the corrodible metal parts. Because crabs and fish are sensitive to this electrochemical phenomena and will tend to avoid its source, corrodible metal trigger parts are undesirable.

Most commercial traps have rectangular entrance openings of a size that has become a de facto standard in the industry. However, traps having "non-standard" size entrance openings may require triggers of non-standard sizes, especially if the trigger includes both top and bottom mounted fingers. The trigger described by Hendricks is not easily adapted to fit non-standard sizes of entrance openings.

U.S. Pat. Nos. 5,478,273 of Ives and 5,771,627 of Mattson et al. describe crab pots specially designed for catching Dungeness crabs. Dungeness crabs are a particularly aggressive species of crab. These crab pots feature all-metal construction and permanently installed triggers to help contain Dungeness crabs once caught. The entrance frames include top and bottom rods spaced apart in a vertical plane. The triggers comprise pairs of spaced-apart wire fingers that are formed of a single length of wire looped around the top rod at two places to form a hinge. A span of the wire connects the loops near the top rod. The pairs of wire fingers hang from the top rod and across the entrance opening to rest against the bottom rod. Because the triggers are hinged directly to the entrance frame, they may not be removed for repair or replacement without bending or breaking the triggers or the entrance frame. Installation of this type of trigger on an existing, triggerless non-Dungeness crab trap would require the tunnel netting of the trap to be partially removed before the trigger wires could be wrapped around the entrance frame to form the hinge. Tools and significant time and effort would be required for its installation. When reinstalled, the tunnel netting would likely interfere with the operation of this type of trigger.

SUMMARY OF THE INVENTION

An object of the invention is, therefore, to provide a one-way entrance gate for a marine animal trap that is of simple and rugged construction capable of withstanding the environmental conditions and handling to which marine animal traps are exposed.

Another object of the invention is to provide such an entrance gate that may be removably installed on conventional crab pots having entrance openings of various sizes and that is easy to install and remove without tools.

A further object of the invention is to provide such an entrance gate including top-hinged bails to minimize the opening of the entrance gate by slow-moving species such as starfish and thereby minimize the possibility of escape by trapped marine animals.

Yet another object of the invention is to provide such an entrance gate having a hinge member that is mountable to a top portion of an entrance frame of the trap to define a guide space for pivotally supporting a pivot end of each of the bails such that the guide space constrains the movement of the bails between a closed position and an inwardly pivoted open position.

Still another object of the invention is to provide such an entrance gate having a narrow profile that is suitable for use with both vertical and inclined entrance openings.

These and other objects and advantages of the invention are accomplished by an entrance gate removably mountable to a marine animal trap of the type including trap walls forming a chamber and including an entrance frame attached to at least one of the trap walls. A piece of bait meat or a lure is placed within the chamber before the trap is lowered to the bottom of a body of water, such as a lake or ocean. The entrance frame defines an entrance opening that allows a marine animal in search of the bait to enter the chamber of the trap. The entrance frame includes top and bottom portions bordering the entrance opening and typically also includes side portions so that the entrance frame forms a rectangular shape. An inwardly extending entrance tunnel is typically formed in the trap walls by netting or wire that converges to terminate at the entrance frame. The entrance frame may be mounted in a generally vertical plane when used for swimming species or in an inclined orientation to maximize the vertical distance between the entrance opening and a floor of the trap.

The entrance gate of the present invention includes an elongate hinge member and multiple finger-like bails pivotally mounted to the hinge member in spaced-apart relation along the length of the hinge member. The term "bail" is used broadly herein, so that it encompasses all rigid and semi-rigid structures capable of being hinged to the hinge member, regardless of their size or shape, including metal or plastic rods, molded plastic fingers, and other such structures long enough to extend across at least a portion of the entrance opening. A pivot end of each bail is rotatably or pivotally supported within a guide space of the hinge member. The entrance gate is removably mounted to an interior face of the entrance frame of the trap, with a mounting surface of the hinge member secured adjacent the top portion of the entrance frame. The mounting surface has a generally concave shape that is adapted to fit the contour of the top portion. The bails extend through notches formed in the hinge member opposite the mounting surface. The notches allow the bails to rotate or pivot inwardly from a closed position to an open position. In the closed position, the bails span between the top and bottom portions of the entrance opening. The inward rotational movement toward the open position permits a marine animal to enter the chamber of the trap by pushing against the bails. After the marine animal passes the entrance gate, gravitational forces, assisted by a rotation-opposing device, cause the bails to return to the closed position to block egress of the trapped marine animal. The rotationopposing device may comprise, e.g., a resilient band such as an elastic cord or spring stretched across the bails and connected at its ends to the hinge member. Alternatively, the rotation-opposing device may comprise one or more resilient members connected to the bails.

The entrance gate is preferably made of durable materials that are resistant to salt water and ultraviolet radiation. In a preferred embodiment, the hinge member is formed of an extruded polymer or copolymer resin such as styrene-acrylonitrile copolymer (SAN). The bails are preferably straight rods or fingers formed from corrosion-resistant stainless steel rod or wire material, but may also be formed of molded plastic or any other suitable rigid or semi-rigid material and formed in other suitably elongate shapes. The pivot end of the bails may be formed by bending the stainless steel rod or wire into an L-shape. To fit the L-shaped bails, the guide space may include a guide channel having a keyhole-shaped cross section with a cylindrical portion extruded along the length of the hinge member.

Alternatively, the pivot end of each bail may be formed in a ball shape, with the guide space comprising the socket portion of a ball-in-socket joint. In this embodiment, the guide space may comprise multiple discrete spaces formed in the hinge member at intervals along its length so that each discrete space supports the pivot end of one of the bails.

State and federal fishing regulations may impose dimensional limits on the size of the entrance openings in order to prevent larger, mature marine animals from being trapped. For example, federal regulations may permit a maximum opening size of 9 inches by 9 inches when traps are used to catch cod. Most commercial traps have rectangular entrance openings that are 9 inches tall by 36 inches wide. To exclude larger marine animals, optional excluder bars are rigidly mounted to the hinge member at 9-inch intervals so that they extend from the hinge member to span between the top and bottom portions of the frame, dividing the entrance opening into 9-inch squares. The distal ends of the excluder rods are removably secured to the bottom portion of the entrance frame, e.g., by a wire or a plastic tie.

Additional objects and advantages of this invention will be apparent from the following detailed description of preferred embodiments thereof, which proceeds with reference to the accompanying drawings.

BRIEF DESCRIPTION OF THE DRAWINGS

FIG. 3 is an enlarged cross-sectional view of the entrance gate and entrance frame taken along line 3—3 of FIG. 2 and showing a bail of the entrance gate partially pivoted toward an open position;

FIG. 4 is an enlarged cross-sectional view of the entrance gate and entrance frame taken along line 4—4 of FIG. 2 and showing an excluder rod of the entrance gate;

FIG. 5 is an enlarged cross-sectional view of a hinge member of the entrance gate taken along line 4—4 of FIG. 2;

FIG. 6 is an enlarged cross-sectional view of a hinge member of the entrance gate taken along line 3—3 of FIG. 2;

FIG. 7 is an enlarged fragmentary perspective view of the entrance gate of FIG. 2 mounted on a top portion of the entrance frame and showing a rotation-opposing resilient band stretched across the bails;

DETAILED DESCRIPTION OF PREFERRED EMBODIMENTS

Figure 1:
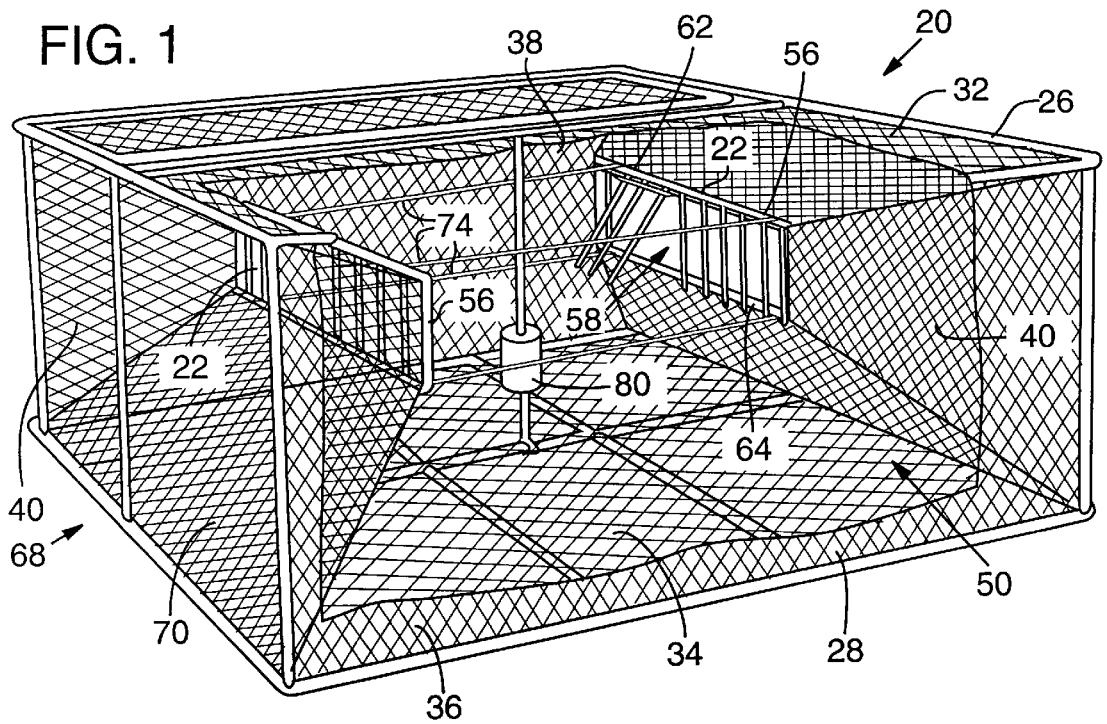
FIG. 1 is a perspective view of a marine animal trap fitted with entrance gates in accordance with the present invention; a portion of the trap walls are broken away to show detail of the entrance gates.

FIG. 1 shows a pictorial view of a marine animal trap 20 fitted with a pair of one-way entrance gates 22, which represent a first preferred embodiment of the present invention. With reference to FIG. 1, trap 20 is generally box-shaped and includes a structural frame 26 supporting netting 28 that forms top and bottom walls 32 and 34, front and back walls 36 and 38, and a pair of side walls 40 forming a chamber 50 of trap 20. A portion of top wall 32 and front wall 36 are broken away in FIG. 1 to show detail of entrance gates 22 and chamber 50. Each side wall 40 includes a rectangular entrance frame 56 that defines an entrance opening 58 large enough to allow a marine animal (FIGS. 9–11) to enter chamber 50. Each entrance frame 56 is formed of a loop of metal rod and includes spaced-apart top and bottom portions 62 and 64.

A pair of inwardly extending entrance tunnels 68 are formed in side walls 40 so that netting 28 of each side wall 40 converges to terminate at entrance frame 56. Entrance tunnels 68 each include a ramp portion 70 proximal to bottom wall 34. Structural lines 74 join entrance frames 56 and draw them together toward the center of chamber 50 so that entrance tunnels 68 and ramp portions 70 are pulled taut. A piece of bait 80 is suspended within chamber 50 to attract marine animals into trap 20. Entrance frames 56 are shown oriented in generally vertical planes to provide the most direct path to bait 80.

Figure 2:
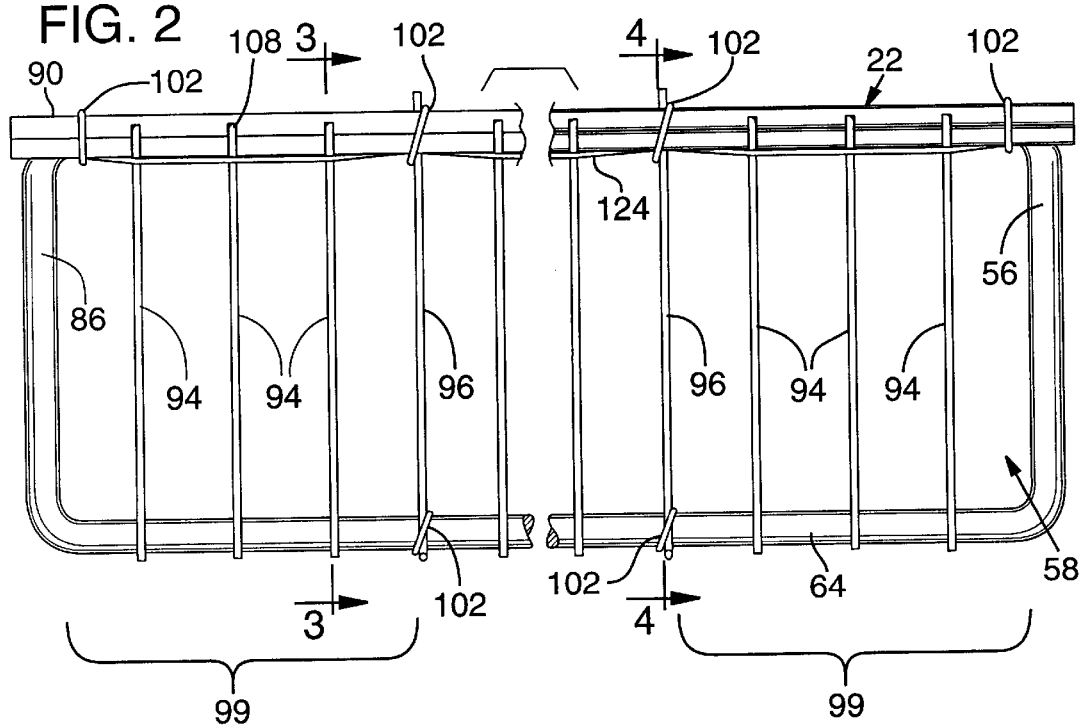
FIG. 2 is an enlarged framentary front elevational view of the entrance gate of FIG. 1 mounted on an entrance frame of the trap.

FIG. 2 is an enlarged fragmentary elevational view of entrance gate 22 as seen from the interior of chamber 50. FIGS. 3 and 4 are enlarged cross-sectional views taken along respective lines 3—3 and 4—4 of FIG. 2. With reference to FIGS. 2–4, entrance gate 22 is removably mounted to an interior face 86 of entrance frame 56. Entrance gate 22 includes an elongate hinge member 90 and multiple bails 94 spaced apart along hinge member 90 and rotatably connected thereto. A plurality of optional excluder bars 96 are spaced apart along hinge member 90 and rigidly mounted through holes on FIGS. 2–4 in hinge member 90. Excluder bars 96 are positioned at approximate nine-inch intervals, taking the place of every fourth bail 94 to divide entrance opening 58 into segments 99. In accordance with federal fishing regulations, entrance openings of traps used for cod fishing must be less than nine inches square to exclude larger species such as halibut. Excluder bars 96 allow a conventional crab trap, having a nine-inch tall, rectangular entrance opening, to be easily converted for cod-fishing use.

FIGS. 5 and 6 are enlarged cross-sectional views of hinge member 90 taken along respective lines 3—3 and 4—4. FIG. 7 is an enlarged perspective view of a portion of entrance gate 22 and entrance frame 56. With reference to FIGS. 2–7, hinge member 90 includes a generally concave mounting surface 100 shaped to conform to interior face 86 of entrance frame 56 and, in particular, to a portion of interior face 86 formed by top portion 62 of entrance frame 56. The conformity between mounting surface 100 and interior face 86 promotes a secure fit that prevents twisting of entrance gate 22 about top portion 62 of entrance frame 56.

Entrance gate 22 is removably secured to entrance frame 56 by multiple ties 102 wrapped tightly around hinge member 90 and top portion 62. Additional ties 102 are used to secure distal ends 104 of excluder bars 96 to bottom portion 64 of entrance frame 56. So that entrance gate 22 may be quickly and easily installed and removed from trap 20, ties 102 are preferably made of plastic, wire, or any other material that can be conveniently secured, i.e., by tying it manually, and conveniently removed, i.e., by untying it manually or cutting it with a knife or scissors.

Bails 94 are preferably formed of stainless steel wire or rod for durability, but may also be formed of plastic or other suitable rigid or semi-rigid material. Each bail 94 includes a pivot end 108 pivotally supported within a guide space 110 of hinge member 90. Hinge member 90 and guide space 110 thereby provide a bearing surface 112 (FIG. 3) within which pivot end 108 is pivotally supported. For ease of manufacture, guide space 90 is preferably a key-shaped channel formed or extruded along hinge member 90, but any space large enough to receive one of bails 94 and to support pivot end 108 within the space will suffice. To reduce manufacturing costs, pivot end 108 is preferably formed by bending bail 94 from a single length of wire or rod so that bail 94 is L-shaped. Each bail 94 extends through one of a plurality of notches 116 formed in hinge member 90 opposite mounting surface 100.

Notches 116 are sized to receive bails 94 and to provide clearance that allows bails 94 to pivot inwardly from a closed position "C" toward an open position "O". In the closed position, bails 94 span between top portion 62 and bottom portion 64 of entrance frame 56. An end wall 118 of notch 116 limits the inward rotation of bail 94, preferably to less than 90 degrees. However, notches 116 could feasibly be formed as full slots (not shown) without end walls to allow bails 94 to rotate 180 degrees. A rotation opposing device 120 is provided to urge bails 94 toward the closed position. In the preferred embodiments, rotation opposing device 120 is an elastic cord 124 that is lightly stretched across bails 94 opposite entrance frame 56. Elastic cord 124 is woven behind each excluder bar 96 to distribute the tension of elastic cord 124 more evenly across bails 94. Elastic cord 124 includes ends 126 (FIG. 8) that are secured to hinge ends 128 of hinge member 90.

Near the closed position, elastic cord 124 provides minimal resistance to pivotal movement of bails 94. The amount of resistance is increased as elastic cord 124 is stretched by the pivotal movement of bails 94 toward the open position. By minimizing the resistance to pivotal movement when bails 94 are closed, entrance gate 22 provides little opposition to marine animals as they begin to enter trap 20. Reduced resistance near the closed position is important because resistance to entry is a deterrent to marine animals. A marine animal that attempts to enter trap 20 through entrance gate 22 but encounters resistance before it progresses through entrance opening 58 may turn away from entrance gate 22 and avoid being trapped. However, at a certain point during movement through entrance opening 58, the marine animal has committed itself to moving past bails 94, which close behind the marine animal to trap it within chamber 50. Thus, it is important that the resistance to pivotal movement of the bails 94 is minimized up to the point where the marine animal is committed to entering trap 20.

Figure 8:
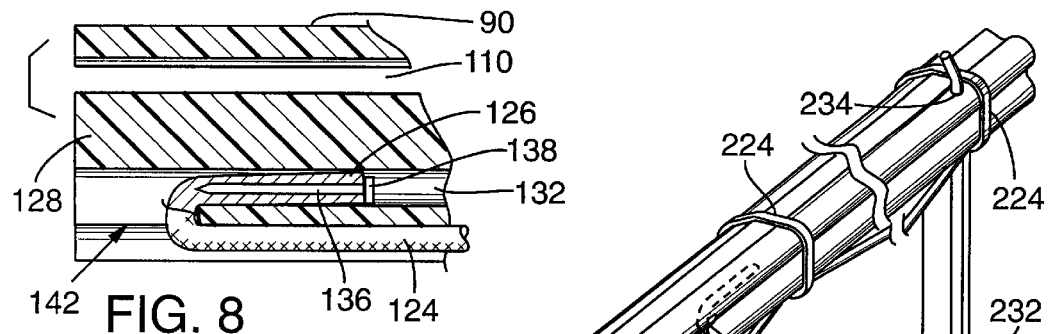
FIG. 8 is a cross-sectional view taken along lines 8—8 of FIG. 7 showing detail of a connection between the rotation-opposing resilient band and the hinge member.

FIG. 8 is a cross-sectional view taken along lines 8—8 of FIG. 7 showing detail of one of hinge ends 128 and the manner in which elastic cord 124 is mounted to hinge member 90. The following description includes reference to both hinge ends 128, which are identical, mirror images of each other. With reference to FIG. 8, hinge member 90 includes an anchor hole 132 at each of hinge ends 128. Ends 126 of elastic cord 124 are secured to hinge member 90 by inserting ends 126 within anchor holes 132. A galvanized brad 136 having a head 138 small enough to 10 slide into anchor holes 132 is driven into each of cord ends 126 so that head 138 protrudes from end 126. Ends 126 are thereby stiffened by brads 136 so that ends 126 are easily manually inserted into anchor holes 132. Brads 136 also prevent ends 126 from being pulled out of anchor holes 132 when elastic cord 124 is tensioned by the movement of bails 94. This manner of mounting elastic cord 124 allows elastic cord 124 to be securely but removably mounted to hinge member 90 for trouble-free operation and easy replacement in the field.

End notches 142 are provided at hinge ends 128 to receive elastic cord 124 where ends 126 of elastic cord 124 turn into anchor holes 132. End notches 142 help retain ends 126 within anchor holes 132 and help protect elastic cord 124 from damage and wear. End notches 142 prevent elastic cord 124 from rotating around and rubbing against hinge ends 128 as bails 94 are rotated. By securing ends 126 so that elastic cord 124 does not rotate around hinge ends 128, end notches 142 maintain tension on elastic cord 124 when bails 94 nearest hinge ends 128 are rotated toward the open position, thereby facilitating a consistent closure force of rotation opposing device 120.

Hinge member 90 is preferably formed of a polymer or copolymer resin such as styrene-acrylonitrile copolymer (SAN). However, any durable material that is resistant to degradation in cold temperatures and in the presence of salt water and sunlight is suitable. For ease of manufacture, hinge member 90 is preferably extruded so that guide space 110 and anchor holes 132 are formed along the entire length of hinge member 90 as it is extruded. Notches 116 are typically routed or cut into hinge member 90. Alternatively, guide space 110 and/or notches 116 may comprise multiple recesses (not shown) molded or machined in mounting surface 100 of hinge member 90 and sized to receive pivot ends 108 of bails 94.

Figure 9:
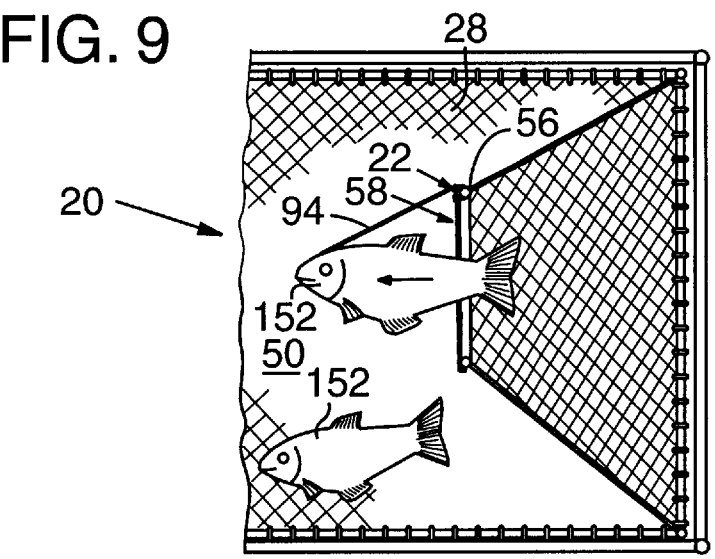
FIG. 9 is an enlarged partial side elevational view of the trap and entrance gate of FIG. 1 showing fish entering the trap through the entrance gate.
Figure 10:
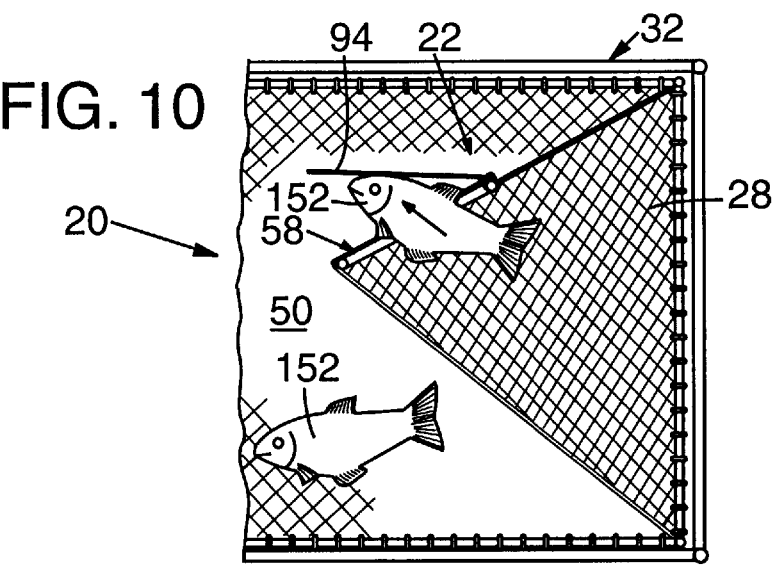
FIG. 10 is an enlarged partial side elevational view of an entrance gate in accordance with the present invention mounted on a trap having an inclined entrance frame and showing crabs entering the trap through the entrance gate.

FIGS. 9 and 10 are partial front elevational views of trap 20 with entrance gate 22 mounted in respective vertical and inclined positions and showing a plurality of swimming marine animals 152 such as cod fish being trapped by trap 20. As shown in FIG. 9, entrance frame 56 and entrance gate 22 are mounted in the vertical position to allow swimming marine animals 152 the most direct path through entrance opening 58 to access bait 80 (FIG. 1). As shown in FIG. 10, entrance gate 22 is also operable for catching swimming marine animals 152 when used with entrance frame 56 mounted in the inclined position. When used in the inclined position, the rotation of bails 94 is limited to less than 90 degrees, and preferably to about 60 degrees, to prevent bails 94, when fully open, from getting caught in netting 28 of top wall 32 of trap 20. The narrow profile of bails 94 allows entrance gate 22 to be effective for catching swimming marine animals 152 in either of the vertical or inclined positions.

Figure 11:
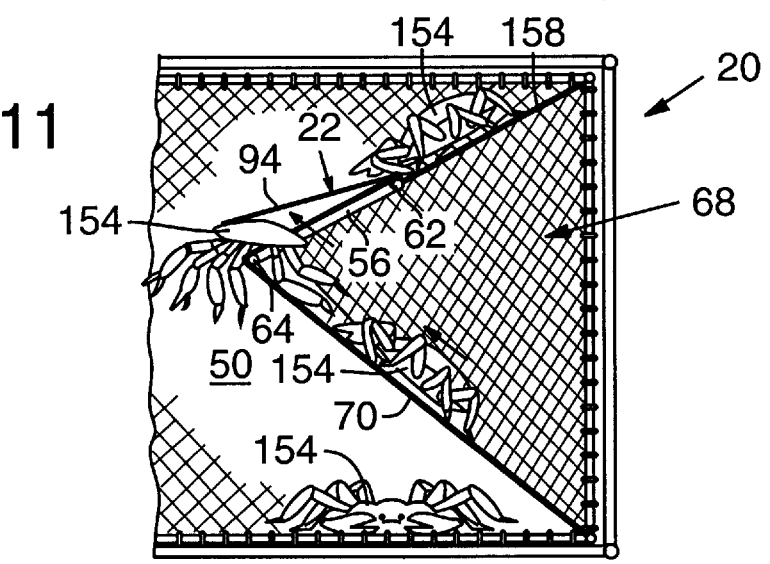
FIG. 11 shows the marine animal trap and entrance gate configuration of FIG. 10 in use for trapping crabs.

FIG. 11 shows the trap 20 and entrance gate 22 configuration of FIG. 10 in use for trapping crawling marine animals such as crabs 154. As shown in FIG. 11, the top-hinged configuration of entrance gate 22 allows crabs 154 to enter chamber 50 by crawling up ramp portion 70 of entrance tunnel 68 and over bottom portion 64 of entrance frame 56. Because bails 94 are hinged from top portion 62 of entrance frame 56 they form an effective barrier to crabs 154 attempting to escape trap 20 by crawling onto an inner roof 158 of entrance tunnel 68.

Figure 12A:
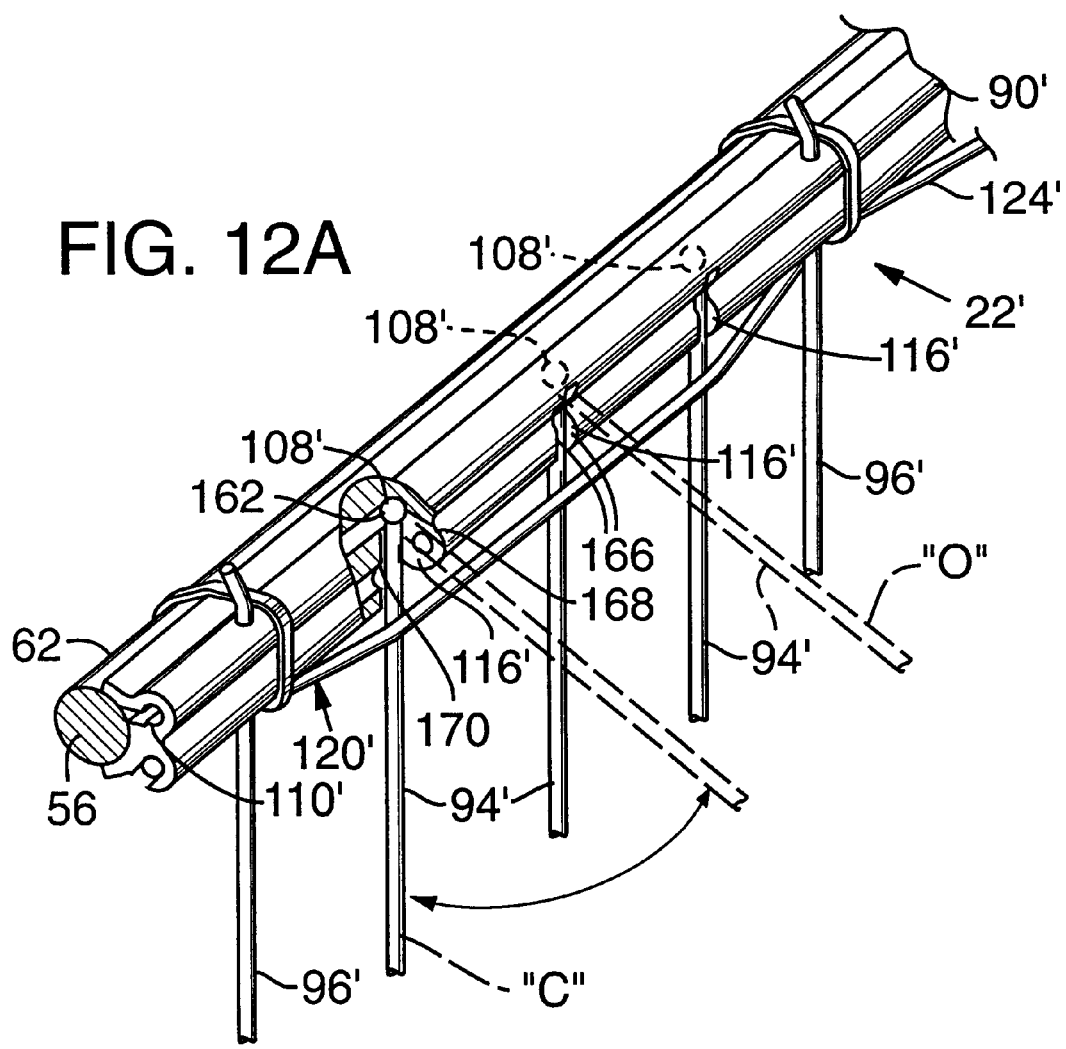
FIG. 12A shows a fragmentary perspective view of an alternative embodiment entrance gate in accordance with the present invention; a portion of the hinge member is broken away to reveal detail of a ball-in-socket joint of the entrance gate.
Figure 12B:
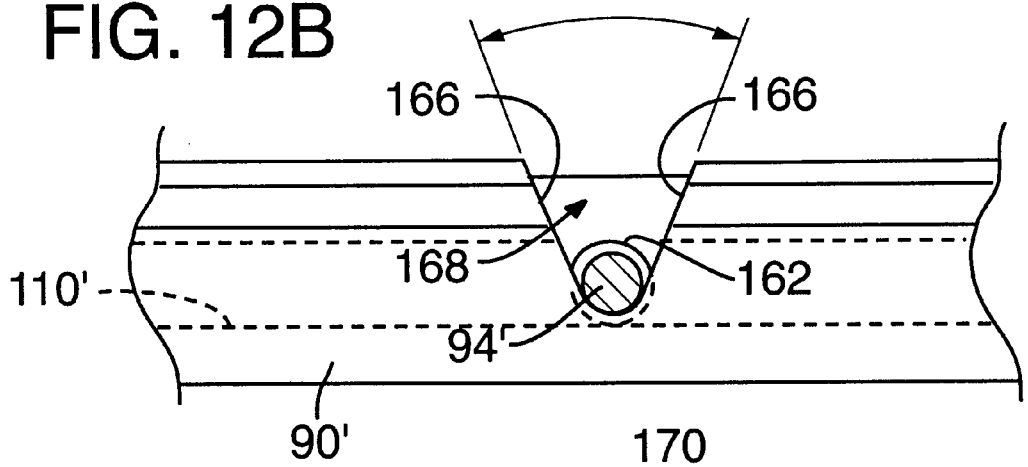
FIG. 12B is a bottom plan view of the alternative embodiment entrance gate of FIG. 12A.

FIGS. 12A and 12B show respective partial pictorial and bottom plan views of an alternative embodiment entrance gate 22'. With reference to FIGS. 12A and 12B, a hinge member 90' includes a guide space 110' partly bounded by a bearing surface 112' and notches 116' similar to the first preferred embodiment entrance gate 22 (FIGS. 2–7). Guide space 110' is preferably a channel, but may comprise a plurality of partially spherical sockets (not shown) in spatial alignment with notches 116'. Each of a plurality of bails 94' includes a pivot end 108' that is pivotally mounted within guide space 110'. Pivot end 108' comprises a ball portion 162 that fits within guide space 110' and is pivotally supported by bearing surface 112' to form a ball-in-socket joint. As in the first preferred embodiment entrance gate 22, bails 94' of entrance gate 22' pivot inwardly between a closed position and an open position. Similarly, the fully open position is defined by the location of end walls 118' of notches 116'. Notches 116' include side surfaces 166 that may be either straight, as in the first preferred embodiment entrance gate 22, or flared such that notches 116' are wider near their mouths 168 than at their bases 170 (FIG. 12B). Side surfaces 166, if flared, will allow bails 94' to pivot laterally. Bails 94', thus, may be allowed three degrees of rotational freedom. The limited lateral pivoting movement afforded by flared side surfaces 166 offers less resistance to marine animals attempting to enter trap 20 (FIG. 1) at an angle from a path normal to the plane of entrance opening 58.

Figure 13:
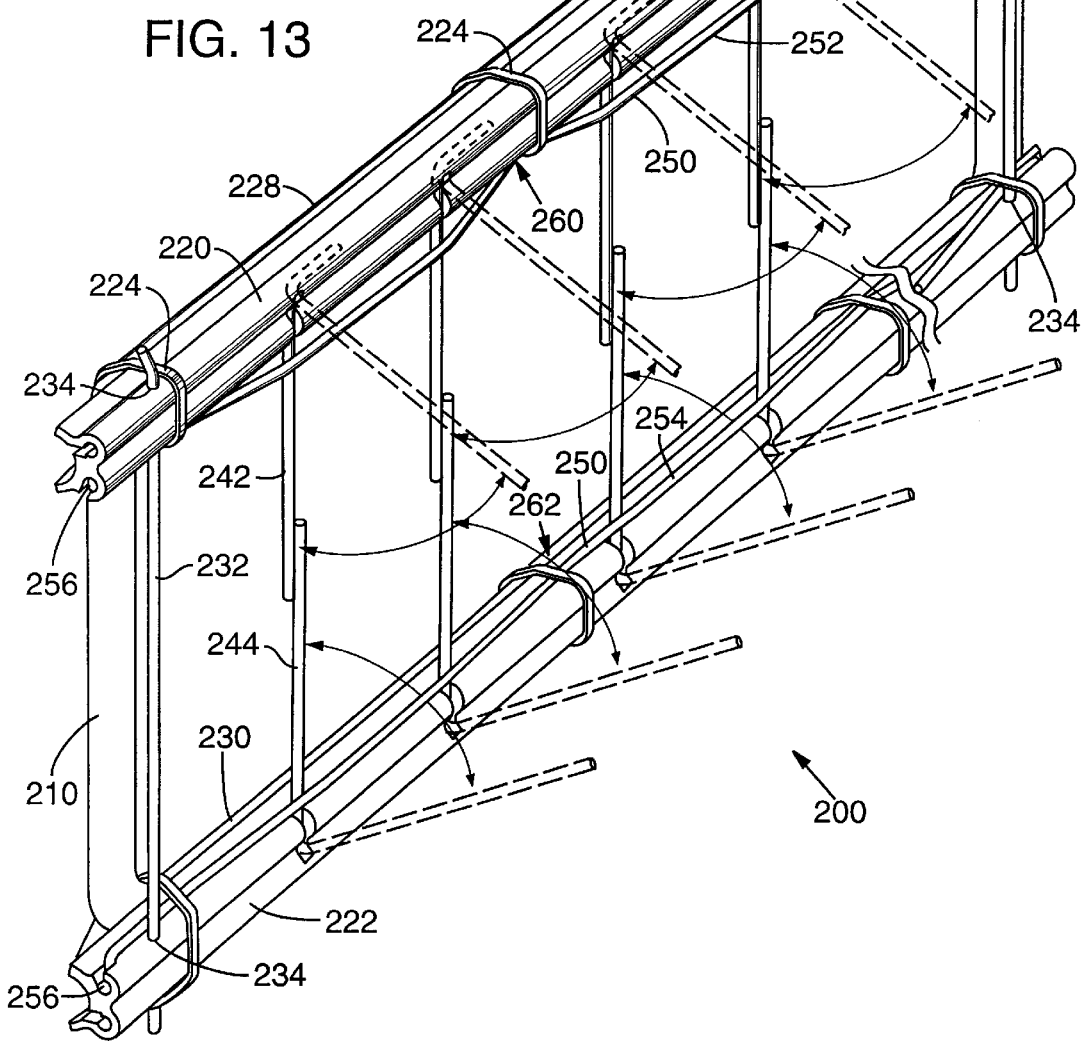
FIG. 13 is a fragmentary perspective view of an entrance gate for a brown crab trap in accordance with a second preferred embodiment of the present invention.

FIG. 13 shows a second preferred embodiment one-way entrance gate 200 in accordance with the present invention mounted to an entrance frame 210 of a brown crab trap (not shown). Brown crabs are of a particularly aggressive species of crab that is indigent to underwater cliffs. Brown crabs are caught in special brown crab traps that are suspended along the sides of cliffs where brown crabs are known to live. These suspended brown crab traps will rest in any orientation. Thus, the entrance gates used with them must be capable of operation in any orientation. With reference to FIG. 13, entrance gate 200 includes first and second hinge members 220, 222. Hinge members 220, 222 are secured by plastic ties 224 to spaced-apart first and second portions 228, 230 of entrance frame 210. A pair of tie rods 232 extend through mounting holes 234 in hinge members 220, 222 near their ends to join hinge members 220, 222 together. Entrance gate 200 includes first and second sets of spaced-apart bails 242, 244 pivotally mounted to respective first and second hinge members 220, 222. The method of pivotally mounting bails 242 and 244 to hinge members 220, 222 is preferably identical to the mounting methods of either the first preferred embodiment entrance gate 22 or the alternative first embodiment entrance gate 22'. Bails 242 mounted to first hinge member 220 extend, when in the closed position, toward second hinge member 222. Conversely, bails 244 mounted to second hinge member 222 extend, when in the closed position, toward first hinge member 220. Preferably, bails 242 and 244 are shorter than the distance between first and second portions 228, 230 of entrance frame. Together, aligned pairs of bails 242, 244 form a barrier that spans substantially the entire distance between first and second portions 228, 230 when bails 242, 244 are in the closed position. The dual-hinge configuration of entrance gate 200 is, thus, an effective one-way gate in any orientation.

A pair of rotation opposing devices 250 preferably comprise first and second elastic cords 252, 254. First and second elastic cords 252, 254 are stretched across respective first and second sets of bails 242, 244. Elastic cords 252, 254 are attached at their ends to anchor holes 256 of respective first and second hinge members 220, 222 in the same manner as elastic cord 124 of the first preferred embodiment entrance gate 22. Plastic ties 224 are wrapped around entrance frame 210, hinge members 220, 222, and elastic cords 252, 254 at intervals along the lengths of hinge members 220, 222 to removably mount entrance gate 200 to entrance frame 210. Plastic ties 244 capture elastic cords 252, 254 within troughs 260, 262 of respective first and second hinge members 220, 222 (FIGS. 5 and 6), thereby evenly distributing the tension of elastic cords 252, 254 across bails 242, 244.

It will be obvious to those having skill in the art that many changes may be made to the details of the above-described embodiments of this invention without departing from the underlying principles thereof. The scope of the present invention should, therefore, be determined only by the following claims.

I claim:

1. A one-way entrance gate adapted for mounting to a marine animal trap of the type including walls bordering a chamber and including an entrance frame in one or more of the walls, the entrance frame bordering a trap opening sized to permit a marine animal to enter the chamber, and the entrance frame including spaced-apart top and bottom portions, comprising:

a hinge member having a length and mountable to the entrance frame, the hinge member defining a guide space located substantially adjacent the entrance frame when the hinge member is mounted to the entrance frame; and a plurality of rigid bails spaced apart along the length of the hinge member, each of the bails having a pivot end and a free end, the pivot end of each bail rotatably mounted within the guide space of the hinge member so that the guide space and the pivot end together form an articulating joint that constrains the movement of the bail between closed and open positions, the bails sized to span between the top and bottom portions of the entrance frame when in the closed position, the bails rotatable toward the open position by a marine animal entering the chamber of the trap, the bails when in the closed position blocking the egress of a marine animal from the chamber through the trap opening.

2. The entrance gate of claim 1 in which the entrance gate is supported by the entrance frame in an orientation such that gravity acts on the bails to urge the bails toward the closed position.

3. The entrance gate of claim 1, further comprising a rotation-opposing device for urging the bails toward the closed position.

4. The entrance gate of claim 3 in which the rotation-opposing device comprises a resilient band connected to the hinge member and positioned across the bails to urge the bails toward the closed position.

5. The entrance gate of claim 1 in which the hinge member includes a mounting surface adapted to be placed adjacent the top portion of the entrance frame when the entrance gate is mounted to the trap and an outer surface opposite the mounting surface, the guide space including a plurality of notches formed in the outer surface of the hinge member, the notches sized and positioned to cradle the bails when the bails are in the closed position.

6. The entrance gate of claim 5 in which the notches are sized to permit pivotal movement of the bails and to limit the pivotal movement to less than 90 degrees.

7. The entrance gate of claim 1, further comprising at least one excluder rod fixedly mounted to the hinge member so that the at least one excluder rod spans between the respective top and bottom portions of the entrance frame when the entrance gate is mounted to the trap, thereby limiting the size of marine animal that may pass through the trap opening.

8. The entrance gate of claim 7 in which the bails and the excluder rods are made of metal wire rod.

9. The entrance gate of claim 1, in which the hinge member is formed of an extruded plastic resin.

10. An entrance gate in accordance with claim 1 that is removably mountable to the trap.

11. In a marine animal trap of the type intruding trap walls and an entrance frame in at least one of the trap walls, the trap walls defining a chamber adapted to hold bait or a lure, the entrance frame bordering a trap opening sized to permit a marine animal to enter the chamber, and the entrance frame including a top portion and a bottom portion spaced apart from the top portion, a one-way entrance gate that allows a marine animal to enter the chamber through the trap opening and that restricts egress of the marine animal from the chamber through the trap opening, the entrance gate comprising:

- a hinge member having a length and mountable to the entrance frame, the hinge member defining a guide space located substantially adjacent the entrance frame when the hinge member is mounted to the entrance frame, the guide space including a plurality of notches spaced apart along the hinge member; and
- a plurality of bails spaced apart along the length of the binge member, each of the bails having a pivot end and a free end, the pivot end of each bail rotatably mounted with the guide space of the hinge member, the free ends of the bails extending through the notches, the notches sized to constrain the movement of the bails between closed and open positions, the bails sized to span between the top and bottom portions of entrance frame when in the closed position, the bails rotatable toward the open position by a marine animal entering the chamber of the trap, the bails when in the closed position blocking the egress of a marine animal from the chamber through the trap opening.

12. The marine animal trap of claim 11 in which the entrance gate further comprises a rotation-opposing device for urging the bails toward the closed position.

13. The marine animal trap of claim 12 in which the rotation-opposing device comprises a resilient band connected to the hinge member and positioned across the bails to urge the bails toward the closed position.

14. The marine animal trap of claim 11 in which the hinge member includes a mounting surface adapted to be placed adjacent the top portion of the entrance frame when the entrance gate is mounted to the trap and in which the notches are sized and positioned to cradle the bails when the bails are in the closed position.

15. The marine animal trap of claim 11, further comprising at least one excluder rod fixedly mounted to the hinge member so that the excluder rod spans between the respective top and bottom portions of the entrance frame when the entrance gate is mounted to the trap, thereby limiting the size of marine animal that may pass through the trap opening.

16. A marine animal trap in accordance with claim 11 in which the entrance gate is removably mounted to the entrance frame.

17. A one-way entrance gate adapted for mounting to a marine animal trap of the type including walls bordering a chamber and including an entrance frame in one or more of the walls, the entrance frame bordering a trap opening sized to permit a marine animal to enter the chamber, and the entrance frame including spaced-apart top and bottom portions, comprising:

- a hinge member having a length, a mounting surface along the length, and an outer surface opposite the mounting surface, the mounting surface shaped to conform to the entrance frame, the hinge member removably mountable to the top portion of the entrance frame, the hinge member defining a guide space located substantially adjacent the top portion of the entrance frame when the hinge member is mounted to the entrance frame, the guide space including a plurality of notches spaced apart along the outer surface of the hinge member;
- a plurality of bails spaced apart along the length of the hinge member, each of the bails having a pivot end and a free end, the pivot ends rotatably mounted within the guide space of the hinge member, the free ends of the bails extending through the notches, the notches sized to constrain the rotation of the bails between a closed position and an open position, the notches cradling the bails when the bails are in the closed position, the bails sized to span between the top and bottom portions of the entrance frame when in the closed position, the bails rotatable toward the open position by a marine animal entering the chamber of the trap, the bails when in the closed position blocking the egress of a marine animal from the chamber through the trap opening; and
- a rotation-opposing device operably engaging the bails to urge the bails toward the closed position.

18. The entrance gate of claim 17 in which:

- at least one of the bails is a pivot bail that includes a ball-shaped end pivotally mounted within the guide space of the hinge member to form a ball-in-socket joint; and
- the notch through which the pivot bail extends includes opposing tapered side surfaces to allow lateral rotation of the pivot bail along the length of the hinge member when the pivot bail is rotated away from the closed position and toward the open position, thereby allowing pivotal movement of the pivot bail with three degrees of rotational freedom.

19. The entrance gate of claim 17 in which the hinge member includes opposing first and second hinge members removably mountable to the respective top and bottom portions of the entrance frame, the bails including opposing first and second sets of bails rotatably mounted to the respective first and second hinge members, the first set of bails extending from the top portion of the entrance frame toward the bottom portion of the entrance frame and the second set of bails extending from the bottom portion toward the top portion so that the first and second sets of bails together block the egress of a marine animal from the chamber through the trap opening, the entrance gate further comprising:

- a tie rod for joining the first and second hinge members together as a unit to allow convenient installation and storage of the entrance gate as a unit.

20. The entrance gate of claim 17 in which the bails are formed of metal wire rod and the hinge member is formed of an extruded resin.

* * * * *

UNITED STATES PATENT AND TRADEMARK OFFICE
CERTIFICATE OF CORRECTION

PATENT NO. : 6,035,575
DATED : March 14, 2000
INVENTOR(S) : David J. Hilty

It is certified that error appears in the above-identified patent and that said Letters Patent is hereby corrected as shown below:

Title page,
Item [56] References Cited, insert the following U.S. Patent References:

| -- 2,119,828 | 5/1937  | Nordenstam  | 43/100    |
|    2,760,297 | 8/1956  | Buyken      | 43/105    |
|    3,678,612 | 7/1972  | Hendrickson | 43/66     |
|    4,184,283 | 1/1980  | Wyman       | 43/102    |
|    4,843,756 | 7/1989  | Wyman et al.| 43/102    |
|    4,905,405 | 3/1990  | Hendricks   | 43/100    |
|    5,168,653 | 12/1992 | Wyman et al.| 43/100    |
|    5,478,273 | 12/1995 | Ives        | 452/1     |
|    5,771,627 | 6/1998  | Mattson et al.| 43/100 --. |

Column 4,
Line 37, "rotationopposing" should read -- rotation-opposing --.

Column 7,
Line 61, delete "10" before "slide".

Column 9,
Line 21, "indigent" should read -- indigenous --.

Column 10,
Line 65, "intruding" should read -- including --.

UNITED STATES PATENT AND TRADEMARK OFFICE
CERTIFICATE OF CORRECTION

PATENT NO. : 6,035,575
DATED : March 14, 2000
INVENTOR(S) : David J. Hilty

It is certified that error appears in the above-identified patent and that said Letters Patent is hereby corrected as shown below:

Column 11,
Line 16, "binge" should read -- hinge --.
Line 18, "with" should read -- within --.
Line 22, insert "the" before "entrance".

Signed and Sealed this

Twentieth Day of November, 2001

*Attest:*

*Attesting Officer*

NICHOLAS P. GODICI
*Acting Director of the United States Patent and Trademark Office*